United States Patent
Mares et al.

(10) Patent No.: US 11,380,159 B2
(45) Date of Patent: Jul. 5, 2022

(54) CONTENT AGGREGATION SYSTEM AND METHOD OF OPERATING THEREOF

(71) Applicant: Playtech Software Limited, London (GB)

(72) Inventors: Peter Mares, Tradewinds (GI); Cristina Turbatu, Cadiz (ES)

(73) Assignee: PLAYTECH SOFTWARE LIMITED, London (GB)

(*) Notice: Subject to any disclaimer, the term of this patent is extended or adjusted under 35 U.S.C. 154(b) by 295 days.

(21) Appl. No.: 16/833,893

(22) Filed: Mar. 30, 2020

(65) Prior Publication Data

US 2021/0304557 A1 Sep. 30, 2021

(51) Int. Cl.
*G07F 17/32* (2006.01)
*G06F 16/23* (2019.01)
*G06Q 20/36* (2012.01)

(52) U.S. Cl.
CPC ...... *G07F 17/3227* (2013.01); *G06F 16/2379* (2019.01); *G06Q 20/36* (2013.01)

(58) Field of Classification Search
USPC .......................................................... 463/40
See application file for complete search history.

(56) References Cited

U.S. PATENT DOCUMENTS

| | | |
|---|---|---|
| 7,293,286 B2 | 11/2007 | Owen et al. |
| 7,415,478 B2 | 8/2008 | Owen et al. |
| 7,433,896 B2 | 10/2008 | Owen et al. |
| 7,483,904 B2 | 1/2009 | Owen et al. |
| 7,562,298 B2 | 7/2009 | Patadia et al. |
| 7,647,332 B2 | 1/2010 | Van Flandern et al. |
| 7,810,036 B2 | 10/2010 | Bales et al. |
| 7,840,614 B2 | 11/2010 | Owen et al. |
| 8,005,838 B2 | 8/2011 | Van Flandern et al. |
| 8,099,779 B2 | 1/2012 | Owen et al. |
| 8,423,892 B1 | 4/2013 | Marsland et al. |
| 8,485,897 B1 | 7/2013 | Marsland et al. |
| 8,499,073 B1 | 7/2013 | Gandhi et al. |
| 8,591,304 B2 | 11/2013 | Marsland et al. |
| 8,616,978 B2 | 12/2013 | Gagner et al. |
| 8,814,696 B2 | 8/2014 | Marsland et al. |
| 8,984,130 B1 | 3/2015 | Gandhi et al. |

(Continued)

FOREIGN PATENT DOCUMENTS

| | | |
|---|---|---|
| AU | 2003283404 A8 | 11/2003 |
| CN | 105393266 A | 3/2016 |

(Continued)

OTHER PUBLICATIONS

US 7,159,127 B2, 01/2007, Owen et al. (withdrawn)

(Continued)

*Primary Examiner* — Pierre E Elisca
(74) *Attorney, Agent, or Firm* — Browdy and Neimark, PLLC

(57) ABSTRACT

The presently disclosed subject matter includes a computer-based content aggregation system and a computerized method for identifying a logical geographic location of a piece of content stored on a server. More specifically, the proposed technique generates unique path identifier for each piece of content and enables to communicate data to the particular server, based on the unique path identifier.

13 Claims, 7 Drawing Sheets

(56) References Cited

U.S. PATENT DOCUMENTS

| | | |
|---|---|---|
| 9,219,776 B2 | 12/2015 | LeCroy et al. |
| 9,875,604 B2 | 1/2018 | Gagner et al. |
| 9,888,056 B2 | 2/2018 | LeCroy et al. |
| 2004/0126750 A1 | 7/2004 | Theilmann et al. |
| 2004/0167867 A1 | 8/2004 | Owen et al. |
| 2004/0167868 A1 | 8/2004 | Owen et al. |
| 2004/0167871 A1 | 8/2004 | Owen et al. |
| 2004/0167880 A1 | 8/2004 | Smith |
| 2004/0167899 A1 | 8/2004 | Patadia et al. |
| 2004/0167900 A1 | 8/2004 | Owen et al. |
| 2004/0167920 A1 | 8/2004 | Owen et al. |
| 2004/0168084 A1 | 8/2004 | Owen et al. |
| 2004/0230557 A1 | 11/2004 | Bales et al. |
| 2004/0230679 A1 | 11/2004 | Bales et al. |
| 2004/0230917 A1 | 11/2004 | Bales et al. |
| 2004/0230947 A1 | 11/2004 | Bales et al. |
| 2006/0174132 A1 | 8/2006 | Owen et al. |
| 2008/0065508 A1 | 3/2008 | Watt et al. |
| 2008/0127281 A1 | 5/2008 | Van Flandern et al. |
| 2008/0201872 A1 | 8/2008 | Kaser |
| 2008/0320022 A1 | 12/2008 | Owen et al. |
| 2010/0115553 A1 | 5/2010 | Van Flandern et al. |
| 2010/0312857 A1 | 12/2010 | Ehlers |
| 2011/0053672 A1 | 3/2011 | Gagner et al. |
| 2011/0174765 A1 | 7/2011 | Patel et al. |
| 2011/0174768 A1 | 7/2011 | Yarro et al. |
| 2011/0174771 A1 | 7/2011 | Desanto et al. |
| 2011/0213655 A1 | 9/2011 | Henkin et al. |
| 2011/0244933 A1 | 10/2011 | Lee et al. |
| 2012/0264511 A1 | 10/2012 | Marsland et al. |
| 2012/0264520 A1 | 10/2012 | Marsland et al. |
| 2013/0012310 A1* | 1/2013 | Shepard .................. A63F 13/79 463/29 |
| 2013/0144412 A1* | 6/2013 | Guinn ................. G07F 17/3244 700/91 |
| 2013/0167162 A1* | 6/2013 | Fernandez ............ A63F 13/828 719/328 |
| 2013/0311277 A1 | 11/2013 | Watt et al. |
| 2014/0087810 A1 | 3/2014 | Gagner et al. |
| 2014/0335953 A1 | 11/2014 | Marsland et al. |
| 2014/0339018 A1 | 11/2014 | Blinn |
| 2014/0379799 A1 | 12/2014 | Lecroy et al. |
| 2014/0379851 A1 | 12/2014 | Lecroy et al. |
| 2015/0119120 A1* | 4/2015 | Spagnola .............. A63F 13/798 463/1 |
| 2015/0371504 A1* | 12/2015 | Guinn ................. G07F 17/3276 463/31 |
| 2016/0092088 A1* | 3/2016 | Doyle ................ H04N 21/8549 715/738 |
| 2016/0099995 A1 | 4/2016 | Lecroy et al. |
| 2016/0162532 A1 | 6/2016 | Zhang et al. |
| 2016/0267530 A1 | 9/2016 | Watt et al. |
| 2016/0337426 A1 | 11/2016 | Shribman et al. |
| 2017/0333789 A1* | 11/2017 | Shepard ................. A63F 13/77 |
| 2018/0139264 A1 | 5/2018 | Lecroy et al. |
| 2019/0222619 A1 | 7/2019 | Shribman et al. |
| 2020/0155933 A1* | 5/2020 | Pierce ..................... A63F 13/69 |

FOREIGN PATENT DOCUMENTS

| | | |
|---|---|---|
| CN | 105580035 A | 5/2016 |
| EP | 1561193 A2 | 8/2005 |
| EP | 2062211 A2 | 5/2009 |
| EP | 3011511 | 4/2016 |
| EP | 3014538 A1 | 5/2016 |
| EP | 3220330 A1 | 9/2017 |
| WO | 2004047048 A2 | 6/2004 |
| WO | 2004075094 A2 | 9/2004 |
| WO | 2007134313 A2 | 11/2007 |
| WO | 2008005135 A1 | 1/2008 |
| WO | 201036956 A1 | 4/2010 |
| WO | 10141506 A1 | 12/2010 |
| WO | 2012141919 A1 | 10/2012 |
| WO | 14209562 A1 | 12/2014 |
| WO | 2014204657 A1 | 12/2014 |
| WO | 2016181383 A2 | 11/2016 |
| WO | 2018142414 A1 | 8/2018 |
| WO | 2018183325 A1 | 10/2018 |

OTHER PUBLICATIONS

Playtech lauches industry-leading content aggregation technology downloaded from https://calvinayre.com/2019/01/08/press-releases/playtech-launches-industry-leading-content-aggregation-technology/ (Jan. 2019).

* cited by examiner

CONTENT AGGREGATION SYSTEM AND METHOD OF OPERATING THEREOF

TECHNICAL FIELD

The presently disclosed subject matter relates to a computerized content aggregation system, and more particularly, to a computerized gaming content aggregation system and methods of operating thereof.

BACKGROUND

In the industry of computerized games, a content aggregation system or platform, is a software or hardware system that provides a standardised protocol or application programming interface (API) that integrates various entities of the network, and assists them to communicate with each other through the content aggregation platform. Different remote game servers (RGSs) can be integrated into content aggregation system platforms. In turn, the content aggregation platform is usually integrated into multiple player management systems and gaming platforms that connect between client terminals to gaming creators and operators, and wallet management systems that support the gaming.

Content aggregation of this nature introduces a number of complexities at the aggregation platform level, for example, when multiple instances of the aggregation platform exist, and each has multiple instances of the same RGS connected to it potentially, in more than one geographic area. Moreover, the same content can be available from multiple instances of the same RGS across the multiple aggregation platform instances. Identifying the exact location of a particular content within a particular RGS that is connected to a particular instance of the aggregation platform currently involves many challenges. The problems compound even further when a single gaming operator or a casino is served by multiple different aggregation platforms that deliver the content to it.

Therefore, a simplified integration of content is desired.

GENERAL DESCRIPTION

According to one aspect of the presently disclosed subject matter there is provided A computer-based content aggregation system, comprising:
an aggregator aggregation platform (AAP);
one or more aggregation platforms operatively communicating with the AAP, wherein each of the one or more aggregation platforms is associated with an aggregation identifier indicative of at least a geographic location of the associated aggregation platform;
at least one remote game server (RGS) configured for storing at least one piece of content and operatively communicating with a designated aggregation platform of the one or more aggregation platforms, wherein each of the one or more RGS is associated with an RGS identifier indicative of at least a geographic location of the associated RGS,
wherein each of the at least one RGS is configured to:
associate a content identifier for each of the stored at least one piece of content indicative of characteristics of the content; and
communicate the at least one associated content identifier and the RGS identifier to the designated aggregation platform;
wherein each of the at least one aggregation platform is configured to:
communicate to the AAP both the at least one content identifier and the RGS identifier received from each of the at least one RGS, and the aggregation identifier;
wherein the AAP is configured to generate for each of the stored at least one piece of content, a respective unique path identifier, based on the associated content identifier, the RGS identifier and the aggregation identifier, for identifying a logical geographic location of each of the stored at least one piece of content, and
wherein usage of a generated unique path identifier, by the AAP, facilitates communicating data, that pertains to the piece of content identified by the generated unique path identifier.

In addition to the above features, the system according to this aspect of the presently disclosed subject matter can optionally comprise one or more of features (i) to (v) below, in any technically possible combination or permutation:
I. the AAP is further configured to:
operatively communicate with at least one external system; and
communicate data that pertains to a specific piece of content stored on a particular RGS, from/to the at least one external system, based on the unique path identifier associated with the specific piece of content;
II. the AAP is further configured to send/receive data that pertains to a specific piece of content stored on a particular RGS to/from the AAP and the particular RGS, using the unique path identifier;
III. the piece of content is a game, and wherein the characteristics of the content include at least one selected from: operational parameters of the game, configuration characteristics of the game, configuration schema and configuration characteristics of the game based on a configuration schema;
IV. wherein the at least one RGS is further configured to the receive updated configuration characteristics, based on the configuration schema, and to configure the schema, based on the updated configuration characteristics;
V. wherein the RGS identifier includes the RGS type and/or the RGS instance, and the AAP is further configured to communicate updated configuration characteristics, based on the RGS type and/or the RGS instance.

According to another aspect of the presently disclosed subject matter there is provided a computerized method for identifying a location of piece of content, comprising:
providing an aggregator aggregation platform (AAP), one or more aggregation platforms operatively communicating with the AAP, wherein each of the one or more aggregation platforms is associated with an aggregation identifier indicative of at least a geographic location of the associated aggregation platform and at least one remote game server (RGS) configured for storing at least one piece of content and operatively communicating with a designated aggregation platform of the one or more aggregation platforms, wherein each of at least one RGS is associated with an RGS identifier indicative of at least a geographic location of the associated RGS, the method further comprising:
by a processor of each of the at least one RGS:
associating a content identifier for each of the stored at least one piece of content indicative of characteristics of the content; and
communicating the at least one associated content identifier and the RGS identifier to a designated aggregation platform of one or more aggregation platforms;

by a processor of each of the at least one aggregation platform:

communicating to the AAP both the at least one associated content identifier and the RGS identifier received from each of the at least one RGS, and the aggregation identifier;

by a processor of the AAP:

generating a respective unique path identifier for each of the stored at least one piece of content, based on the associated unique content identifier, the unique RGS identifier, and the unique aggregation identifier, for identifying a logical geographic location of each of the stored at least one piece of content, and using the generated unique path identifier, to facilitate communicating data, that pertains to the piece of content identified by the generated unique path identifier.

According to another aspect of the presently disclosed subject matter there is provided a computer-based content aggregation system, comprising:

an aggregator aggregation platform (AAP) comprising a processor;

wherein the AAP is configured, by the processor, to:

operatively communicate with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content;

obtain from each of the one or more aggregation platforms:

(i) the associated aggregation identifier;

(ii) the at least one associated RGS identifier of the at least one RGSs operatively communicating with the aggregation platform; and (iii) the at least one associated content identifier for each of the at least one piece of content stored in each of the at least one RGS that is operatively communicating with the respective aggregation platform;

generate a respective unique path identifier for each of the stored at least one piece of content, based on the obtained associated content identifier, the obtained RGS identifier and the obtained aggregation identifier, for identifying a logical geographic location of each of the stored at least one piece of content; and use the generated unique path identifier, to facilitate communicating data, that pertains to the piece of content identified by the generated unique path identifier.

In addition to the above features, the system according to this aspect of the presently disclosed subject matter can optionally comprise the feature below, in any technically possible combination or permutation:

wherein the AAP is further configured to obtain from each of the one or more aggregation platforms:

(iv) a configuration schema associated with the obtained content; and based on the obtained data and the generated unique path identifier, the AAP is further configured to:

(a) provide data on at least one piece of content and its associated configuration schema;

(b) receive updated configuration characteristics, based on the configuration schema; and (c) apply the updated configuration characteristics.

According to another aspect of the presently disclosed subject matter there is provided a computerized method for identifying a location of piece of content, comprising:

by a processor of an aggregator aggregation platform (AAP) operatively communicating with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content, the method comprising:

obtaining from each of the one or more aggregation platforms the associated aggregation identifier;

obtaining, through each of the at least one aggregation platform, the at least one RGS identifier;

obtaining, through each of the at least one aggregation platform and the at least one RGS, the at least one associated content identifier for each of the at least one piece of content stored in each of the at least one RGS;

generating a respective unique path identifier for each of the stored at least one piece of content, based on the obtained associated content identifier, the obtained RGS identifier and the obtained aggregation identifier for identifying a logical geographic location of each of the stored at least one piece of content; and using the generated unique path identifier, to facilitate communicating data, that pertains to the piece of content identified by the unique path identifier.

According to another aspect of the presently disclosed subject matter there is provided a non-transitory computer readable storage medium tangibly embodying a program of instructions that, when executed by a computer, cause the computer to perform a method for identifying a location of piece of content, comprising:

providing an aggregator aggregation platform (AAP), one or more aggregation platforms operatively communicating with the AAP, wherein each of the one or more aggregation platforms is associated with an aggregation identifier indicative of at least a geographic location of the associated aggregation platform and at least one remote game server (RGS) configured for storing at least one piece of content and operatively communicating with a designated aggregation platform of the one or more aggregation platforms, wherein each of at least one RGS is associated with an RGS identifier indicative of at least a geographic location of the associated RGS, the method further comprising:

by a processor of each of the at least one RGS:

associating a content identifier for each of the stored at least one piece of content indicative of characteristics of the content; and communicating the at least one associated content identifier and the RGS identifier to a designated aggregation platform of one or more aggregation platforms;

by a processor of each of the at least one aggregation platform:

communicating to the AAP both the at least one associated content identifier and the RGS identifier received from each of the at least one RGS, and the aggregation identifier;

by a processor of the AAP:

generating a respective unique path identifier for each of the stored at least one piece of content, based on the associated unique content identifier, the unique RGS identifier, and the unique aggregation identifier, for identifying a logical geographic location of each of the stored at least one piece of content, and using the generated unique path identifier, to facilitate communicating data, that pertains to the piece of content identified by the generated unique path identifier.

According to another aspect of the presently disclosed subject matter there is provided a non-transitory computer readable storage medium tangibly embodying a program of instructions that, when executed by a computer, cause the computer to perform method for identifying a location of piece of content, comprising:

by a processor of an aggregator aggregation platform (AAP) operatively communicating with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content, the method comprising:

obtaining from each of the one or more aggregation platforms the associated aggregation identifier;

obtaining, through each of the at least one aggregation platform, the at least one RGS identifier;

obtaining, through each of the at least one aggregation platform and the at least one RGS, the at least one associated content identifier for each of the at least one piece of content stored in each of the at least one RGS;

generating a respective unique path identifier for each of the stored at least one piece of content, based on the obtained associated content identifier, the obtained RGS identifier and the obtained aggregation identifier for identifying a logical geographic location of each of the stored at least one piece of content; and using the generated unique path identifier, to facilitate communicating data, that pertains to the piece of content identified by the unique path identifier.

The system, method and the non-transitory computer readable storage media disclosed herein according to various aspects, can optionally further comprise one or more of features (i) to (v) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
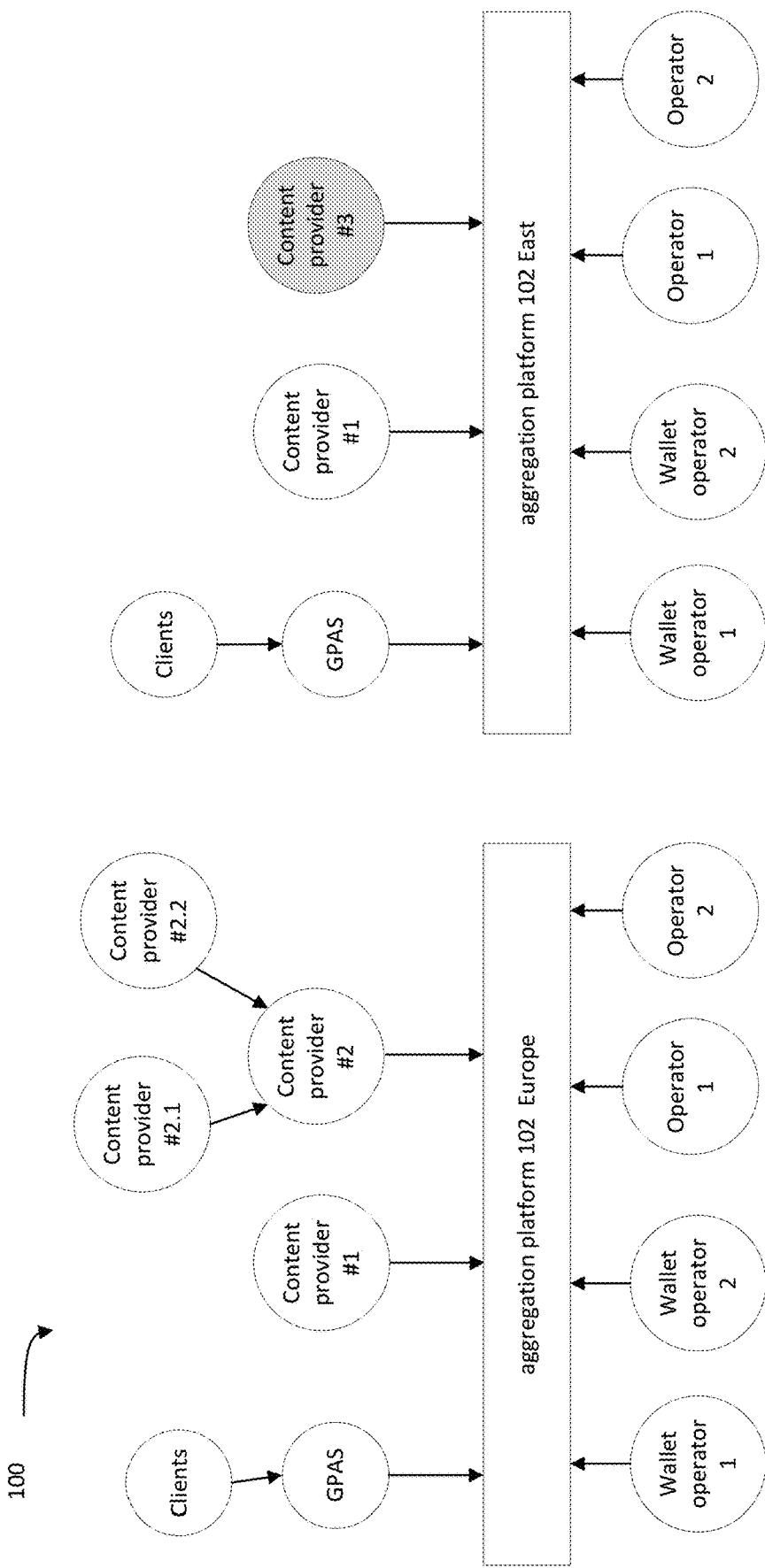
FIG. 1 shows a high-level illustration of a gaming environment 100 in accordance with certain embodiments of the presently disclosed subject matter.

As apparent from the following discussions, and unless specifically stated otherwise, it is appreciated that throughout the specification discussions utilizing terms such as "communicating", "storing", "associating", "using", "generating", "providing", "discovering" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the gaming system disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

Gaming environments involve a large number of separate entities operating and communicating through a complex network and architecture. Content, such as games, are created by a content creator or content provider and are stored on Remote Gaming Servers (RGSs) around the world. A game can be stored on more than one RGS. A licensee of a casino, also to be referred to herein as an operator, can choose to operate one or more games by adding them to the operator's portfolio, while the games themselves are stored on a single RGS or multiple RGSs. Operation of the games is subject to various dynamic parameters and configurations, some of which are dictated by local legislation and some being determined or structured by the content creator, the licensee operator, or the RGS itself. In addition, the games can communicate with external systems, such as backend and management systems of the licensee operators, player management systems, various analytic systems, and wallet management systems. As such, there is a constant communication of data to and from the content stored on a particular RGS, e.g. the game, to other entities operating in the network.

A content aggregation system or platform provides a standardised protocol or API that integrates various entities of the network, and assists them to communicate with each other through the content aggregation platform. In order to simplify the effort needed to integrate different content providers to operators, an Aggregator Aggregation Platform (AAP) is created. The AAP aggregates numerous content aggregation systems (or platforms) in a hierarchal manner and implements a discovery process, after which the APP generates a logical geographic coordinate system of content stored in the network. The logical geographic coordinate system assists the AAP to accurately identify a particular content stored on a particular RGS that communicates with the AAP through one of the aggregation platforms.

Bearing this in mind, attention is drawn to FIG. 1 which shows a high level illustration of a gaming environment 100 in accordance with certain embodiments of the presently disclosed subject matter.

FIG. 1 illustrates a specific example of a gaming environment with two aggregation platforms 102, each located in a different geographic location. One of the platforms is located in Europe, and the other is located in the East. An aggregation platform 102 is configured to implement a unified point of integration for several entities of the network, and provides an abstraction layer(s) between the various entities. As illustrated, aggregation platform 102 aggregates several different content providers (to be referred to hereinbelow also as Remote Game Servers (RGSs)), operators of the content, gaming system (GPAS) providing gaming functionalities, and wallet systems.

Each platform 102 illustrated in FIG. 1 implements a unified interface and aggregates several entities in the complex and dynamic network illustrated in FIG. 1 by operatively communicating with the entities. However, the two platforms 102 in Europe and in the East, do not communicate with each other. As such, content provider #3 that communicates with aggregation platform 102 East, and wishes to communicate with aggregation platform 102 and offer the games created by it to the operators of aggregation platform 102 Europe, cannot do so without a specific connection to the aggregation platform 102 Europe. The reverse applies to content provider #2. Hence, it may be advantageous to integrate, in a higher level, at an aggregator aggregation platform (AAP) layer, the services provided by each aggregation platform 102, in order that entities operating in the network may obtain easier access to all available services.

Figure 2:
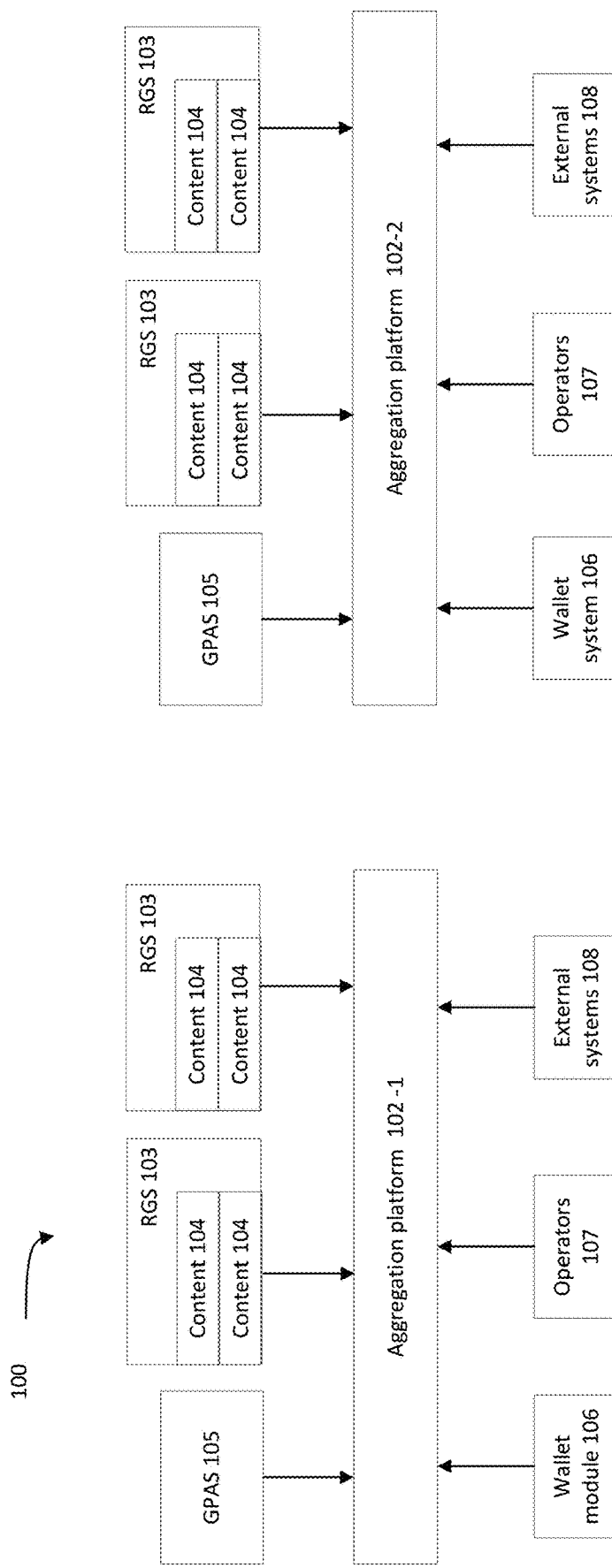
FIG. 2 illustrates a high-level functional block diagram of a gaming environment, in accordance with certain embodiments of the presently disclosed subject matter.

Before illustrating the aggregation of platforms 102 in the higher level of AAP, in order to better describe the functionality of an aggregation platform 102, attention is drawn to FIG. 2 illustrates a high level functional block diagram of the gaming pnenvironment 100, in accordance with certain embodiments of the presently disclosed subject matter.

FIG. 2 illustrates two aggregation platforms 102, aggregation platform 102-1, e.g. representing platform 102 Europe of FIG. 1, and aggregation platform 102-2, e.g. representing platform 102 East of FIG. 1. Aggregation platform 102 operatively communicates with one or more Remote Game Servers (RGSs) 103 (representing the content providers of FIG. 1). In addition, platform 102 operatively communicates with GPAS 105, with one or more wallet systems 106 of wallet operator of FIG. 1, with one or more operators 107, e.g. casino licensees, and with one or more external systems 108.

Each RGS 103 is a content provider. The RGS 103 is a software platform that can be deployed as single or multiple instances and can host one or more types of content 104. In some examples, content 104 is a game. RGSs 103 provides functioning games and gaming services such as clients, game logic, and random number generation to operators 107, that choose to operate the games. Operators 107 include, for example, casinos licensees. RGSs 103 can provide its gaming services to operators 107 via aggregation platform 102.

GPAS (Gaming Platform as a Service) 105 is configured to communicate with aggregation platform 102, as an RGS, and operatively communicates with one or more client terminals (referred to hereinafter as "client") and is configured to run one or more game clients. GPAS can be configured to enable all necessary game management functions (e.g. executing and resolving game logic, game flows, error flows, regulation requirements, etc.) and further operatively communicates, directly, or via platform 102, to operator 107 or wallet systems 106. Other functionalities and gaming services of GPAS 105 are available through aggregation platform 102.

The entities in the network, including aggregation platform 102, RGSs 103 and GPAS 105 can be implemented on one or more server computers, and comprise a processor and memory circuitry (PMC) (not shown). Each PMC of an entity comprises a processor and a memory, and is configured to execute several functional modules in accordance with computer-readable instructions implemented on a non-transitory computer-readable storage medium. Such functional modules are referred to hereinafter as comprised in the PMC.

Furthermore, a person versed in the art would appreciate that in some examples, one or more of the entities in the network can constitute a complex entity, comprised of several entities having a similar functionality, in a consolidated manner. For example, a aggregation platform 102 can be integrated into another aggregation platform 102, both constituting the functionality of the aggregation platform 102 as described throughout the description. Similarly, each RGS 103 can be integrated into another RGS 103, or operate in a collaborative manner. Also, any content referred to as stored in an RGS, can be stored in a remote storage, or in another entity, such as in the aggregation platform 102 or the AAP 103. In such cases, any reference to an identifier of an entity can be referred to as a complex identifier, composed of identifiers of all entities integrated in the complex entity, e.g. composed in a concatenated manner or the like.

As mentioned, it may be advantageous to integrate, in a higher level, the services provided by each aggregation platform 102. Bearing this in mind, reference is made to FIG. 3, showing a high-level functional block diagram of an integrated gaming environment 300, in accordance with certain embodiments of the presently disclosed subject matter.

Figure 3:
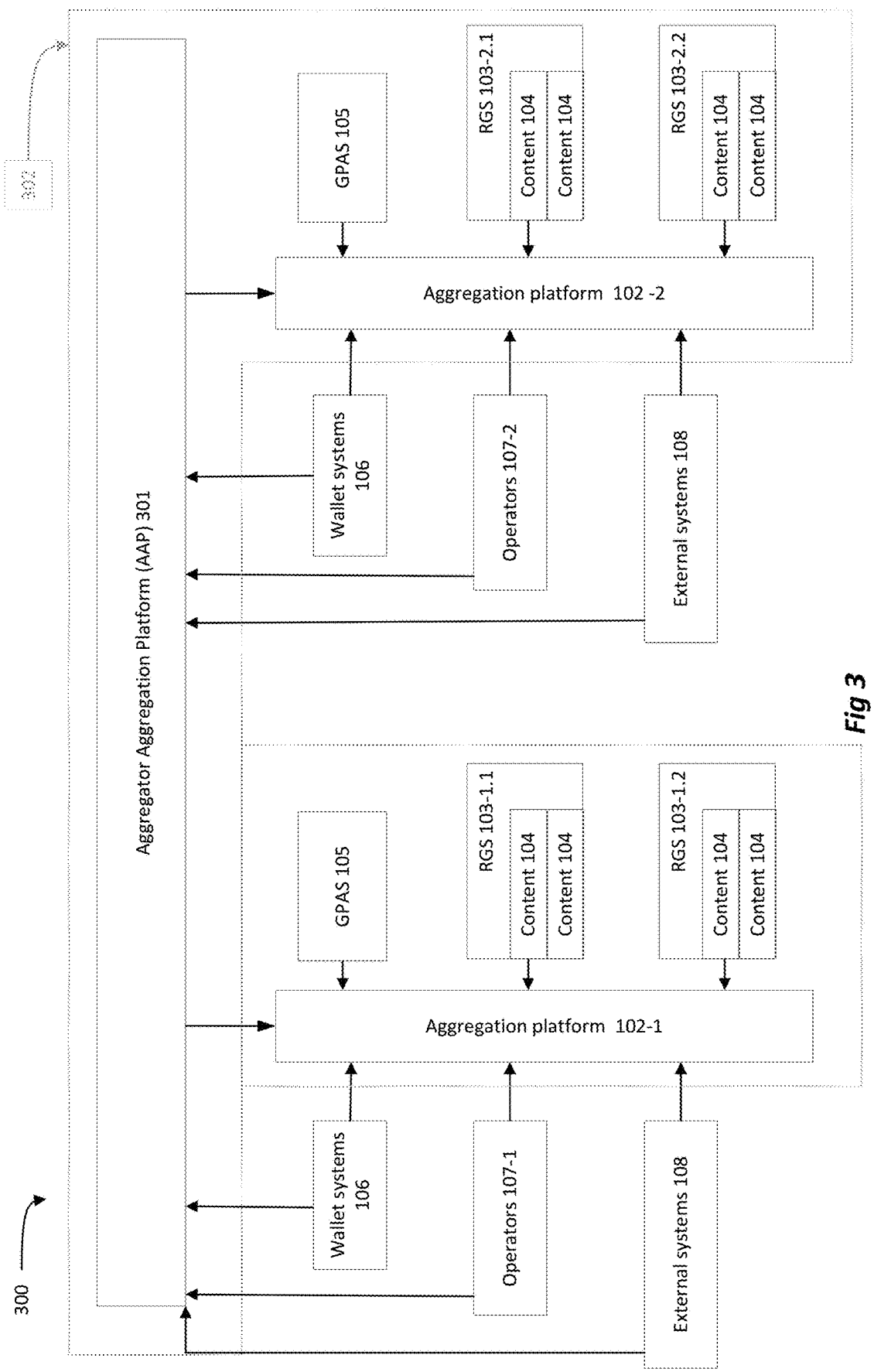
FIG. 3 illustrates a high-level functional block diagram of an integrated gaming environment, in accordance with certain embodiments of the presently disclosed subject matter.

FIG. 3 illustrates an aggregator aggregation platform (AAP) 301 that is configured to aggregate the two aggregation platforms 102 illustrated in FIG. 2. The AAP 301 operatively communicates with aggregation platform 1024 and aggregation platform 102-2 and is configured to obtain data from the platforms 102 and to integrate the data that is received from each platform.

Aggregating the data on each stored content 104 at the AAP 301 level has several technological advantages. Operators 107-1 communicating with the platform 102-1 obtain services from RGS 103-1.1 and/or RGS 103-1.2 only. Aggregating the data on the AAP 301 level enables RGS 103-2.1 and 103-2.2 that communicate with platform 102-2 to provide services and communicate also with operators 1074, and not only operators 107-2. Operators 107-1 can communicate directly with the AAP 301 in a single user interface, and be exposed to services provided by all RGSs 103 from the various platforms 102, including RGS 103-2.1 and 103-2.2. Communicating data from external systems 108 that pertains to a particular piece of content 104 through the AAP 301, is also achieved in a simpler manner.

However, the integration itself involves several challenges with respect to locating and accurately identifying a particular piece of content 104 stored on a particular RGS 103, and communicating data that pertains to the particular piece of content 104, to the correct RGS that stores the piece of content 104, For example, if the game is operated both by an RGS 103-2.1 and by an RGS 103-1.1, any game identifier that is used to identify the game on the RGSs 103 is expected to be the same across both instances of the RGSs 103. This challenge is further enhanced when there are several instances of the platforms 102, each having multiple instances of the same RGS 103 connected to it, in potentially multiple geographic areas, each of which store the same type of game. Assuming that operator 107 wishes to configure a game by updating the game characteristics, such as updating the maximal betting amount, communicating data from the operator 107 to the correct RGS 103 that stores that game, may encounter difficulties.

In order to identify the location of each of stored piece of content 104, AAP 301 aggregates numerous content aggregation systems (or platforms) in a hierarchal manner, and implements a discovery process, after which the AAP 301 generates a logical geographic coordinate system of the network. The logical geographic coordinate system includes generating a unique path identifier for each stored piece of content 104. The unique path identifier assists the AAP 301 to accurately identify the logical geographic location of each of the stored at least one piece of content in the network, in order to facilitate communicating data that pertains to a specific piece of content 104. The meaning of logical geographic location of a piece of content is further described below in relation to FIGS. 5 and 6.

Generating a unique path identifier for each piece of content enables casino licensees (operator 107) to communicate with AAP 301, and configure a game that is operated by separate RGSs 103 and platforms 102, in a single process, through the AAP 301. Moreover, displaying various games 104 operated by various RGSs 103, after discovering them by the AAP 301, enables operators 107 to add them to the casino portfolio operated by them.

In some examples, using the unique path identifier to identify a logical geographic location of a stored piece of content 104 assists additional systems to communicate data that pertains to the piece of content 104, through the AAP 301, in a more simplified manner. Such systems include, for example, external systems 108, wallet systems 106 and GPAS 105.

For example, AAP 301 can run a discovery process and compare the results of content 104 that was returned, to the results of a previous discovery process. Any changes can be conveyed to relevant operators. For example, if a particular game 104 that was available on a particular RGS 103 as discovered in a discovery process, was not returned in the results of a later discovery process, then any operators 107 that added that game 104 to its portfolio, can be notified that the game 104 is no longer available. Another example includes updating operators 107 with respect to any changes to characteristics of game 104, e.g. whether a game moved from a staging mode to a production mode, or a list of the games that are currently operating in each mode. Other characteristics relating to content 104, that were updated, such as if a certain game has updated the languages/currencies or any other information or parameter, then such information can be conveyed back to the operators. The entities of environment 300 marked by a dashed line (block 302 in FIG. 3) are described in FIG. 4, in a hierarchical manner, in a content aggregation network 400.

Figure 4:
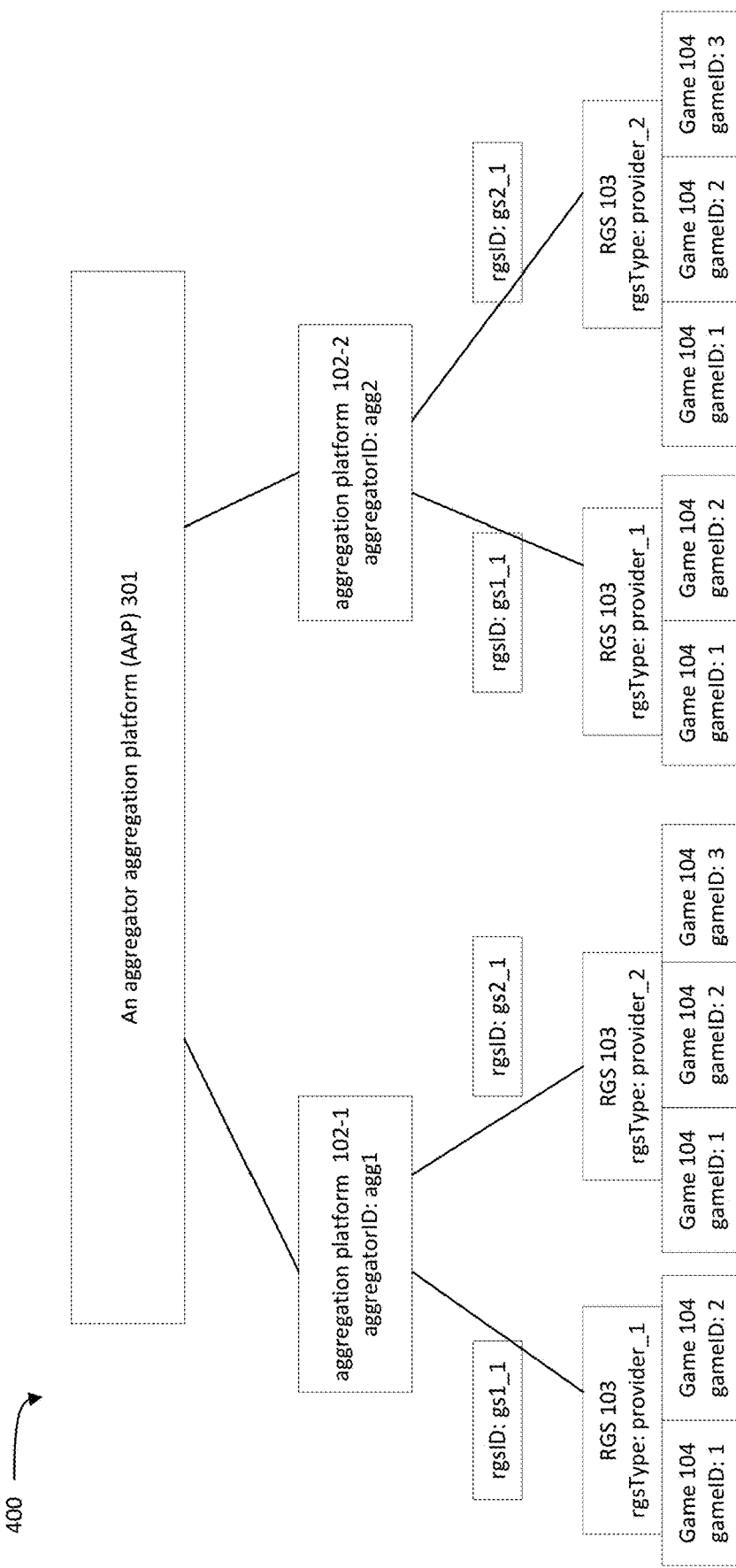
FIG. 4 illustrates a generalized block diagram of a gaming hierarchy in accordance with certain embodiments of the presently disclosed subject matter.

FIG. 4 illustrates a generalized block diagram of a gaming hierarchy configured in accordance with certain embodiments of the presently disclosed subject matter. In some examples, the lowest level includes RGSs 103. Since there are multiple types of RGSs available, such as RGS configured for casino games, GRAS (Gaming Platform as a Service) and such, an identifier that describes the type of the RGS is associated with each RGS 103, denoted as rgsType. For example, RGS 103 denoted by rgsType: provider_1 indicates that the RGS 103 is operated by provider_1.

Since more than one RGS 103 (or instances of a specific RGS type) can be integrated into aggregation platform 102, each instance of RGS 103 is identified by an instance identifier. The instance identifier is local to the instance of the aggregation platform 102 and is denoted as rgsID. The rgsID can be a simple or complex identifier. In order for an RGS to be uniquely identified by the platform 102, each RGS 103 is associated with an RGS identifier. The RGS identifier can include the RGS type and/or the RGS instance. The RGS identifier is indicative of at least a geographic location of the associated RGS. In some examples, the geographic location includes an indication of the territory or area on which the RGS 103 is located. Upon receipt of the RGS identifier by platform 102, platform 102 can obtain data on the geographic location of the RGS 103.

In some examples, each RGS 103 is configured for storing at least one piece of content 104, e.g. a game. The game is hosted and made available through a specific RGS 103. RGS 103 is configured to associate a content identifier for each of the stored content 104. The content identifier is an immutable identifier, denoted in FIG. 4 by gameID. For example, RGS 103 of rgsType: provider_1 stores two games 104 identified by content identifiers gameID: 1 and gameID: 2. In some examples, each content 104 is associated with characteristics. For example, for a content 104 constituting a game, the characteristics of the content can include operational parameters of the game or configuration characteristics of the game. Operational parameters of the game includes for example, versioning information of the game, game paytable (RTF (return to player) information, software package version, list of currencies the game is playable in, list of languages the game supports, etc. Configuration characteristics of the game can include configuration parameters that are often unique to the game itself. Examples of configuration parameters of a slot machine may include (but are not limited to): Maximum Bet, Minimum Bet, Available bet sizes/coin sizes, Free bet sizes/coin sizes, and feature enabling flags. Configuration parameters of a table game such as Blackjack may include (but not be limited to): Number of decks, Number of cards per deck, Insurance allowed and Double Down Bet allowed. In some examples, the content identifier is indicative of characteristics of the content. Further details of providing information on the characteristics of the game 104 and configuration of a game are described below with respect to FIG. 7.

Each RGS 103 is configured to operatively communicate with a designated aggregation platform 102 of the one or more aggregation platforms 102 in the network. RGS 103 is configured to communicate to the designated aggregation platform 102, at least one of the content identifiers associated with each piece of content being stored on the RGS 103 and the RGS identifier.

The network 400 can include more than one instance of an aggregation platform 102, Two instances of aggregation platform 102 are illustrated in FIG. 4, aggregation platform 102-1 and aggregation platform 102-2. Each instance of an aggregation platform 102 must itself be identified by an aggregation identifier, denoted in FIG. 4 as aggregatorID. In case platform 102 is integrated into another platform 102, both constituting the functionality of one platform 102, then the aggregation identifier can be a complex aggregation identifier. Aggregation platform 102-1 is identified by aggregatorID: agg1 and Aggregation platform 102-2 is identified by aggregatorID: agg2. The aggregation identifier is indicative of at least a geographic location of the associated aggregation platform. The geographic location includes an indication of the territory or area in which the aggregation platform 102 is located. Upon receipt of the aggregation identifier later by the AAP 301, the AAP 301 can obtain data on the geographic location of platform 102.

The aggregation platforms 102 are aggregated into the AAP 301. The aggregation platforms 102 operatively communicating with the AAP 301 and AAP 301 are configured to obtain from each platform 102 the one or more content identifiers and RGS identifiers received at platform 102 from each RGS 103. In addition, AAP 301 is configured to obtain from platform 102 the aggregation identifier of the platform itself.

After receiving data from platform 102, AAP 301 is configured to generate, for each stored piece of content, a respective unique path identifier based on the associated content identifier, the RGS identifier and the aggregation identifier. Using a coordinate system that describes the geographic location of a specific piece of content, 104 the unique path identifier can include a structure of a chain of coordinates of the entities involved in the piece of content. For example, the structure can include coordinates such as (aggregatorId, rgsType, rgsID, gameId). The predefined order assists the AAP 301 to accurately and deterministically locate a specific piece of content 104 in a logical manner, in the complex network of an aggregated content system. For example, in order to identify the game 104, with content identifier (gameID) "1", provided by the RGS 103 associated with RGS identifier "provider_1", that is aggregated by the aggregation platform 102 identified by aggregation identifier as "agg1", AAP 301 is configured to generate a unique path identifier of: ("agg1", "provider_1", "gs1_1", "1"). Chaining the identifiers of all entities to generate the unique path identifier assures that path identifier is indeed unique. It is to be noted that although there could exist several games with content identifiers "1" and several RGS 103 with an RGS identifier "provider_1", "gs1_1", each respective unique path, which includes also the different aggregation identifiers, will be unique to AAP 301 generating the path identifier.

In some examples, the structure includes coordinates of entities in the network, in a predefined order. For example, the order can include: "aggregation identifier", "RGS identifier", "content identifier"). In some examples, the RGS identifier includes the RGS type and/or the RGS instance.

The structure of the unique path identifier, based on coordinates in a specific order, inherently indicates the exact location of a piece of content, in a logical manner. The logical location of a piece of content indicates the location of the piece of content within the network, i.e. which entities are involved in order to communicate data to that piece of content (as opposed to the physical location of storing the actual content, in terms of GPS coordinates of the RGS 103).

Moreover, a predefined order of coordinates can describe the parent-child relationship of aggregator platforms in the network, such that the structure of the unique path identifier indicates the logical path of entities in the network from the AAP 301 to the RGS 103 storing the specific piece of content, that should be followed, in order to communicate data to that piece of content 104. The logical location of the piece of content 104 and the indication of the path of entities that are involved from the AAP 301 to the particular RGS that stored that piece of content 104, is to be referred to as a logical geographic location of the piece of content 104. The discovery process is further described below with relation to FIG. 5.

After the AAP 301 generates the unique path identifier, it is configured to use the generated unique path identifier to facilitate communicating data, e.g. to send or receive data, that pertains to the piece of content identified by the generated unique path identifier. Since the unique path identifier constitutes a path, it can use the unique path identifier to communicate data to the particular RGS 103 storing the particular piece of content 104 for implementation and/or configuration.

In examples where the piece of content is a game, the characteristics of the content include at least one of the operational parameters of the game and configuration characteristics of the game. The AAP 301 is configured to send to the particular RGS 103 that stores the particular piece of content 104, data that pertains to the operational parameters of the game and/or the configuration characteristics of the game, using the unique path identifier. In cases where the RGS identifier obtained by the AAP 301 includes the RGS type and/or the RGS instance, the AAP 301 is further configured to communicate operational parameters of the game and/or configuration characteristics of the game, based on the RGS type and/or the RGS instance. Further details of providing information on the characteristics of the game and communicating data that pertains to the operational parameters of the game and/or configuration characteristics of the game, are described below with respect to FIG. 7.

In some examples, the AAP 301 operatively communicates with at least one external system 108 and communicates data that pertains to a specific piece of content 104 stored on a particular RGS 103, from or to the at least one external system 108, based on the unique path identifier associated with the specific piece of content 104.

It is noted that the teachings of the presently disclosed subject matter are not bound by the gaming environment and network described with reference to FIGS. 1-4. Equivalent and/or modified functionality can be consolidated or divided in another manner and can be implemented in any appropriate combination of software with firmware and/or hardware and executed on a suitable device(s) in any suitable cloud-based architectural framework. In certain embodiments, at least some of the described functional modules can be implemented as a standalone entity (or as entities) operatively communicating to the clients and operating in conjunction with AAP 301, aggregation platforms 102, RGSs 103, operators 107, GPAS 105, or the like. In certain embodiments, aggregation platform 102 can be integrated into one or more other platforms, or a wallet system can comprise a plurality of separate wallets (per each licensee) implemented on the same or on different servers; optionally, part of the functions of the separate wallets can be integrated in a centralized manner.

Figure 5:
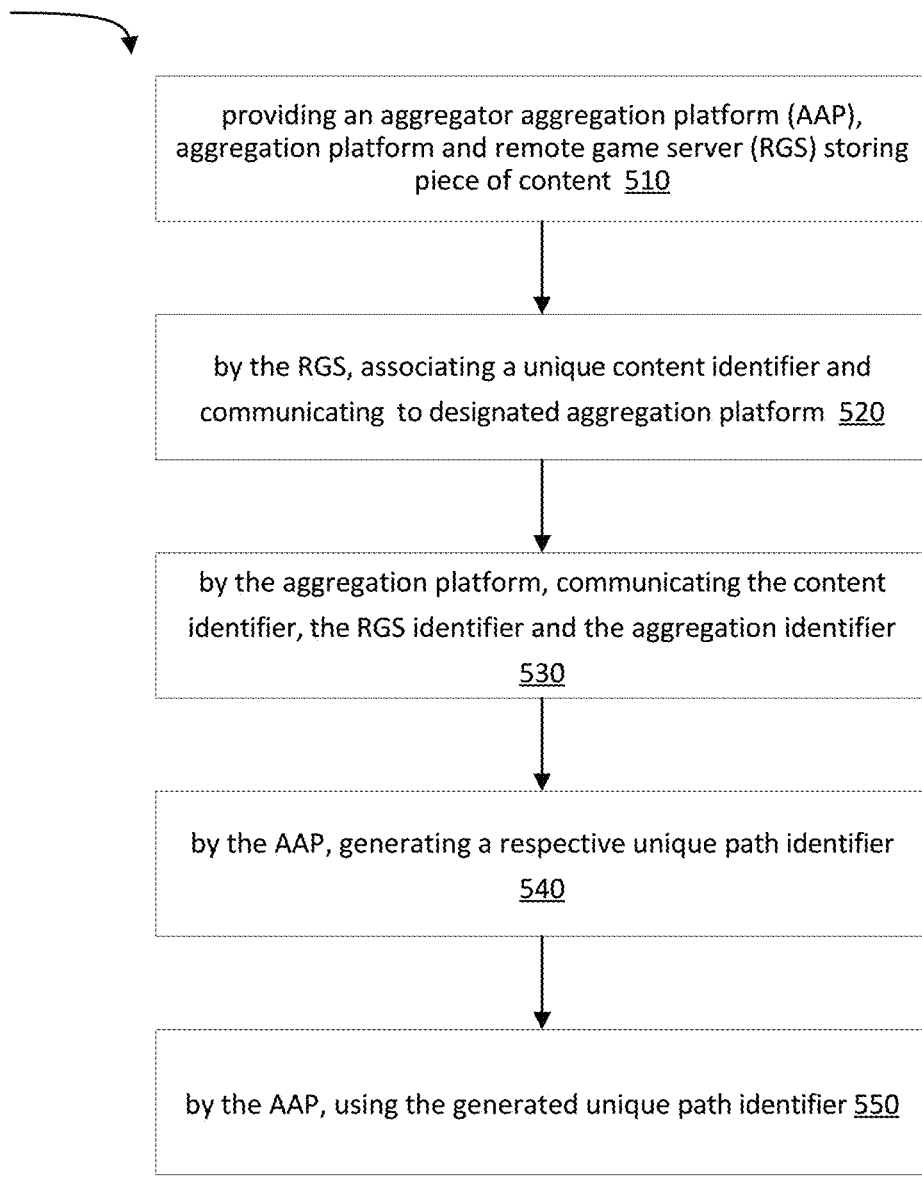
FIG. 5 illustrates a generalized flowchart of operations performed by entities in the gaming hierarchy, in accordance with certain embodiments of the presently disclosed subject matter.

Reference is now made to FIG. 5 illustrating a generalized flowchart of operations performed by entities in the gaming hierarchy, in accordance with certain embodiments of the presently disclosed subject matter.

The operations are performed by entities in the hierarchal network illustrated with reference to FIG. 4, in which there is provided an AAP 301, one or more aggregation platforms 102 each of the one or more aggregation platforms 102 being associated with a aggregation identifier indicative of at least a geographic location of the associated aggregation platform. The one or more aggregation platforms 102 operatively communicate with the AAP 301. In addition, there is provided at least one RGS 103 configured for storing at least one piece of content 104. Each of the at least one RGS 103 is associated with an RGS identifier indicative of at least a geographic location of the associated RGS 103. RGS 103 are configured to operatively communicate with a designated aggregation platform 102 of the one or more aggregation platforms 102 (block 510). Each of the RGS, e.g. by their processors, associate a content identifier for each piece of content 104 that they store. The content identifier for each piece of content 104 is indicative of characteristics of the piece of content 104. In some examples, the piece of content is a game, and the characteristics of the game include operational parameters of the game, or configuration characteristics of the game.

In some examples, the discovery process implemented by AAP 301 includes obtaining data from aggregation platforms 102 that pertains to the pieces of contents 104 that are stored on each RGS 103 operatively communicating with each aggregation platform 102. Each layer sends requests for data to the layer below it, and each layer sends back data to the layer above it. Hence, AAP 301 sends requests for data to platforms 102, and aggregation platforms 102 sends requests to the RGSs 103. Each layer sends back data, until it reaches AAP 301. For example, AAP 301 sends each aggregation platform 102 a request for a list of all RGSs 103 that operatively communicating with the aggregation platform 102. Then, the AAP 103 sends each aggregation platform 102 another request for a list of operators and a list of RGSs 103 that operatively connected to each operator. Based on the response from each aggregation platform 102, AAP 103 can map the rest of the required information, for example, which content is associated with each operator in each RGS 103.

In some examples, the discovery process can include a continuous update. Unless specifically stated otherwise, it is appreciated that throughout the specification the term "continuous update" may refer to receiving, (in push or pull mode), data substantially each time new data is available to RGS 103 and/or platform 102 and/or other entities of the network and/or responsive to predefined events (including scheduled events and events occurring in accordance with predefined periodicity).

During the discovery process, the RGS 103, e.g. using its processor, associates a unique content identifier and communicates the at least one associated content identifier and the RGS identifier to the designated aggregation platform 102 of one or more aggregation platforms that are operatively communicating with (block 520). In some examples, associating a unique content identifier can occur upon first storing the content identifier, irrespective of the discovery process. Once requested, the associated content identifier is sent to the designated aggregation platform 102. Each aggregation platform 102, e.g. using its processor, once requested, communicates to the AAP 301 its aggregation identifier, as well as the data obtained from the each of the RGS 103 operatively communicating with it. The data received from each of the RGS 103 includes, among others, the RGS identifier received from each of the RGS 103 and a list of content identifiers of associated pieces of content stored on that RGS 103 (block 530).

Once the data is obtained by the AAP 301, the AAP 301, e.g. using its processor, generates a unique path identifier for each of the pieces of content 104 stored on each of the RGSs 103 (block 540). AAP 301 generates a respective unique path identifier for each particular piece of content 104, stored on each particular RGS 103, based on at least the following data:

1. the associated particular unique content identifier, generated by the particular RGS 103 for the particular piece of content 104, as received by the aggregation platform 102;
2. the unique RGS identifier of the particular RGS 103 storing the particular piece of content, as received by the aggregation platform 102;
3. the received unique aggregation identifier of the aggregation platform 102 that sent the data relating to the particular piece of content.

Using a coordinate system that describes the geographic location of a specific piece of content 104, the unique path identifier can include a structure of a chain of coordinates of the entities involved in the piece of content. For example, the structure can include coordinates such as (aggregatarId, rgsType, rgsID, gameId). The predefined order assists the AAP 301 to accurately and deterministically locate a specific piece of content 104 in a logical manner, in the complex network of the aggregated content system. For example, in order to identify the game 104, with content identifier (gameID) "1", provided by the RGS 103 associated with RGS identifier "provider_1", that is aggregated by the aggregation platform 102 identified by aggregation identifier as "agg1", AAP 301 generates a unique path identifier of: ("agg1", "provider_1", "gs1_1", "1"). Chaining the identifiers of all entities to generate the unique path identifier assures that the path identifier is indeed unique. It is to be noted that although there could exist several games with content identifiers "1" and several RGS 103 with an RGS identifier "provider_1", "gs1_1", each respective unique path will be unique to AAP 301 generating the path identifier.

In some examples, the structure includes coordinates of entities in the network, in a predefined order. For example, the order can include "aggregation identifier", "RGS identifier", and "content identifier". In some examples, the RGS identifier includes the RGS type and/or the RGS instance. The structure of the unique path identifier, based on coordinates in a specific order, inherently indicates the exact location of a piece of content, in a logical manner. The logical location of a piece of content indicates the location of the piece of content within the network, i.e. which entities are involved in order to communicate data to that piece of content (as opposed to the physical location of storing the actual content, in terms of GPS coordinates of the RGS 103).

Moreover, a predefined order of coordinates can describe the parent-child relationship of aggregator platforms in the network, such that the structure of the unique path identifier indicates the logical path of entities in the network from the AAP 301 to the RGS 103 storing the specific piece of content, that should be followed, in order to communicate data to that piece of content 104. The logical location of the piece of content 104 and the indication of the path of entities to the RGS within it, is referred to as a logical geographic location of the piece of content 104.

After the AAP 301 generates the unique path identifier, the AAP 301 uses the generated unique path identifier to facilitate communicating data, e.g. to send or receive data, that pertains to the piece of content identified by the generated unique path identifier (block 550). Since the unique path identifier constitutes a path, the AAP 301 can use the unique path identifier to communicate data to the particular RGS 103 storing the particular piece of content 104 for implementation and/or configuration, through all the entities on the path, e.g. the platform.

Figure 6:
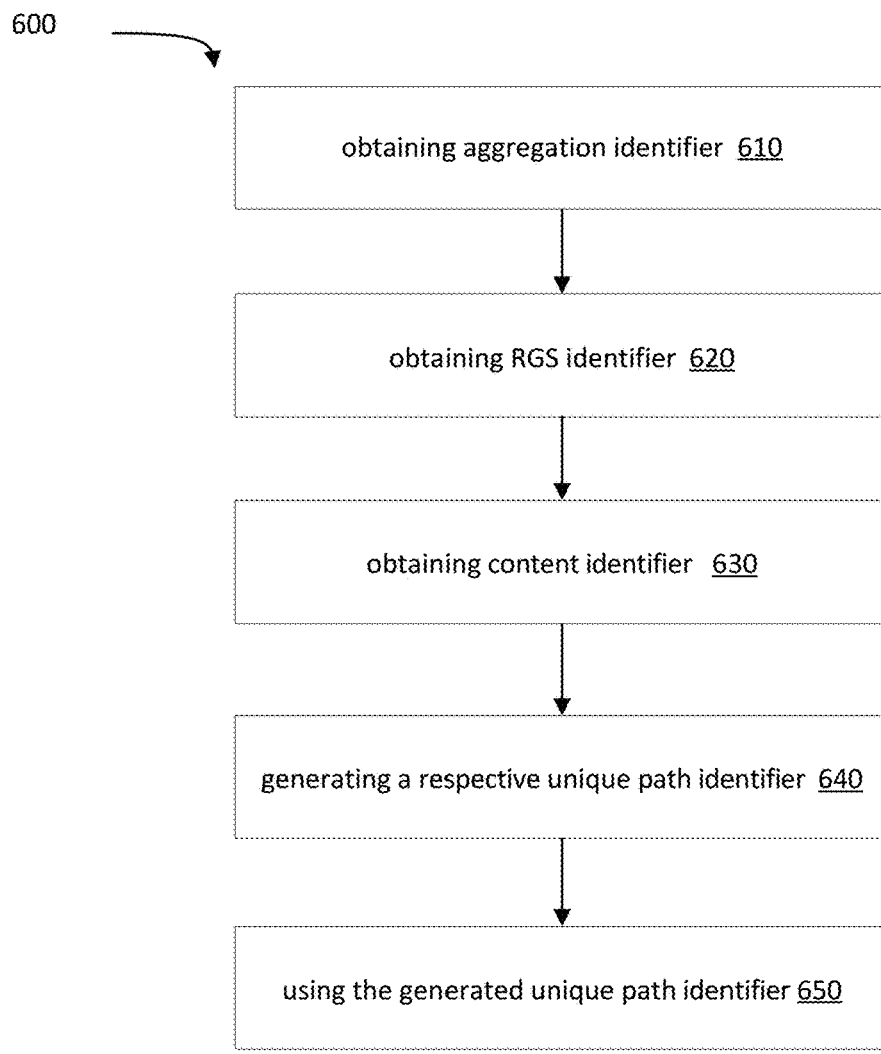
FIG. 6 illustrates a flowchart of operations carried out by an aggregator aggregation platform (AAP) in accordance with certain embodiments of the presently disclosed subject matter.

Reference is now made to FIG. 6 illustrating a flowchart of operations carried out by the AAP 301, in accordance with certain embodiments of the presently disclosed subject matter.

In the hierarchal network illustrated above, the processor of the AAP 301 operatively communicates with one or more aggregation platforms 102, and each of the one or more aggregation platforms 102 is associated with an aggregation identifier indicative of at least a geographic location of the associated aggregation platform. In addition, there is provided at least one RGS 103 configured for storing at least one piece of content 104. Each of the at least one RGS 103 is associated with an RGS identifier indicative of at least a geographic location of the associated RGS 103. RGS 103 is configured to operatively communicate with a designated aggregation platform 102 of the one or more aggregation platforms 102.

In some examples, in order for the AAP 301 to identify the location of a piece of content, the AAP 301, e.g. using its processor, obtains from each of the one or more aggregation platforms 102 the associated aggregation identifier (block 610). For example, the AAP 301 issues a discovery process querying each operatively communicating platform 102 for its aggregation identifier. Alternatively or additionally, once an aggregation platform 102 is operatively communicating to AAP 301, the aggregation platform 102 sends to the AAP 301 its respective aggregation identifier, and the AAP 301 stores in a database the aggregation identifiers of the aggregation platform 102 that operatively communicated with the AAP 301. Obtaining from each of the one or more aggregation platforms the associated aggregation identifier can include retrieving from the database the aggregation identifiers of the aggregation platform 102 that is operatively communicating to AAP 301 (block 610).

For each platform that is operatively communicating with AAP 301, AAP 301 further obtains, through the aggregation platform 102, a list of all RGSs 103 that are operatively communicating with that platform 102, and their respective RGS identifiers (block 620). For example, the list includes at least one RGS identifier of at least one RGS 103 that is operatively communicating with aggregation platform 102.

Each platform obtains from the RGSs 103 that are operatively communicating with the designated platform 102, a list of all pieces of content 104 that are stored on each RGS 103, and their associated content identifiers. Hence, AAP 301 obtains, through each of the aggregation platform 102 and the RGS 103, associated content identifiers for pieces of content 104 stored in each RGS 103 (block 630). For example, AAP 301 obtains at least one content identifier associated with at least one piece of content 104 stored on an RGS 103.

Based on the obtained associated content identifier, the obtained RGS identifier and the obtained aggregation identifier, AAP 301 generates a respective unique path identifier for each of the stored at least one piece of content. The unique path identifier is for identifying a logical geographic location of each of the stored at least one piece of content (block 640). The AAP 301 can then use the generated unique path identifier, to facilitate communicating data that pertains to the piece of content identified by the unique path identifier (block 650). The data can be issued from the AAP 301 or received from other systems or network entities that communicate with the AAP 301, and be sent to the RGS 103 storing the piece of content. For example, the data pertains to one or more characteristics of the content.

As described above, in some examples, each content 104 is associated with characteristics. For example, for a content 104 being a game, the characteristics of the content can include operational parameters of the game or configuration characteristics of the game. Operational parameters of the game include for example, versioning information of the game, game paytable (RTF (return to player) information, software package version, list of currencies the game is playable in, list of languages the game supports, etc. Configuration characteristics of the game can include configuration parameters and/or other requirements. In some examples, different instances of content require specific types of configuration parameters that are often unique to the content itself. Examples of configuration parameters of a slot machine game content may include (but are not limited to): Maximum Bet, Minimum Bet, Available bet sizes coin sizes, Free bet sizes/coin sizes, and Feature enabling flags. In contrast, configuration parameters of a table game such as Blackjack may include (but not be limited to): Number of decks, Number of cards per deck, Insurance allowed, and Double Down Bet allowed.

Due to almost infinite possibilities of combining individual configuration parameters, and the fact that it is impossible to predict the required configuration parameters by a specific game, in some examples an RGS 103 is configured to provide specific configuration capabilities, per game. To address this complexity and enable an RGS 103 to provide configuration capabilities and implement configuration to parameters of a game, the game is configured to generate data describing its configuration parameters. Alternatively, the data describing the configuration parameters can automatically be generated by using known standards in the field, such as the descriptive JSON Schema standard. The data describing the configuration parameters as well as the required structure of the configuration parameters is referred to herein as configuration schema of the content 104. For example, the configuration schema includes the characteristics described above, including Maximum Bet, Minimum Bet, Available bet sizes/coin sizes and such. Configuration schema can also describe other secondary parameters such as labels, comments, data-type identifiers, related values and so forth. Once a configuration schema is generated, the RGS 103 is configured to store the configuration schema and associate between the relevant content and its configuration schema. In some examples, the RGS 103 also configures the game 103 based on its associated configuration schema, e.g. by updating the configuration parameters of the game.

The configuration schema can be retrieved by the RGS 103 at any time during a discovery process, a continuous update, or upon demand, and be sent together with the content identifier to the platform 102 and eventually to the AAP 301. The configuration schema can be provided to entities of the network, and can be used e.g. for analytics, for configuring game parameters by operators 107 etc. In some examples, the configuration schema can be provided to operators or clients or the game, for setting configuration updates, which are later validated, e.g. by the RGS 103 versus the configuration schema. Once receiving configuration updates, the AAP 301 uses the unique path identifier for applying the configuration updates, for example, by sending the configuration updates to the particular RGS 103 storing the particular game 104, for which updates were received, so the RGS 103 can apply the confirmation updates to the game accordingly. Using the unique path identifier is advantageously such that it enables the AAP 301 to communicate the updates to the particular RGS 103 storing the particular game 104 in the network.

Figure 7:
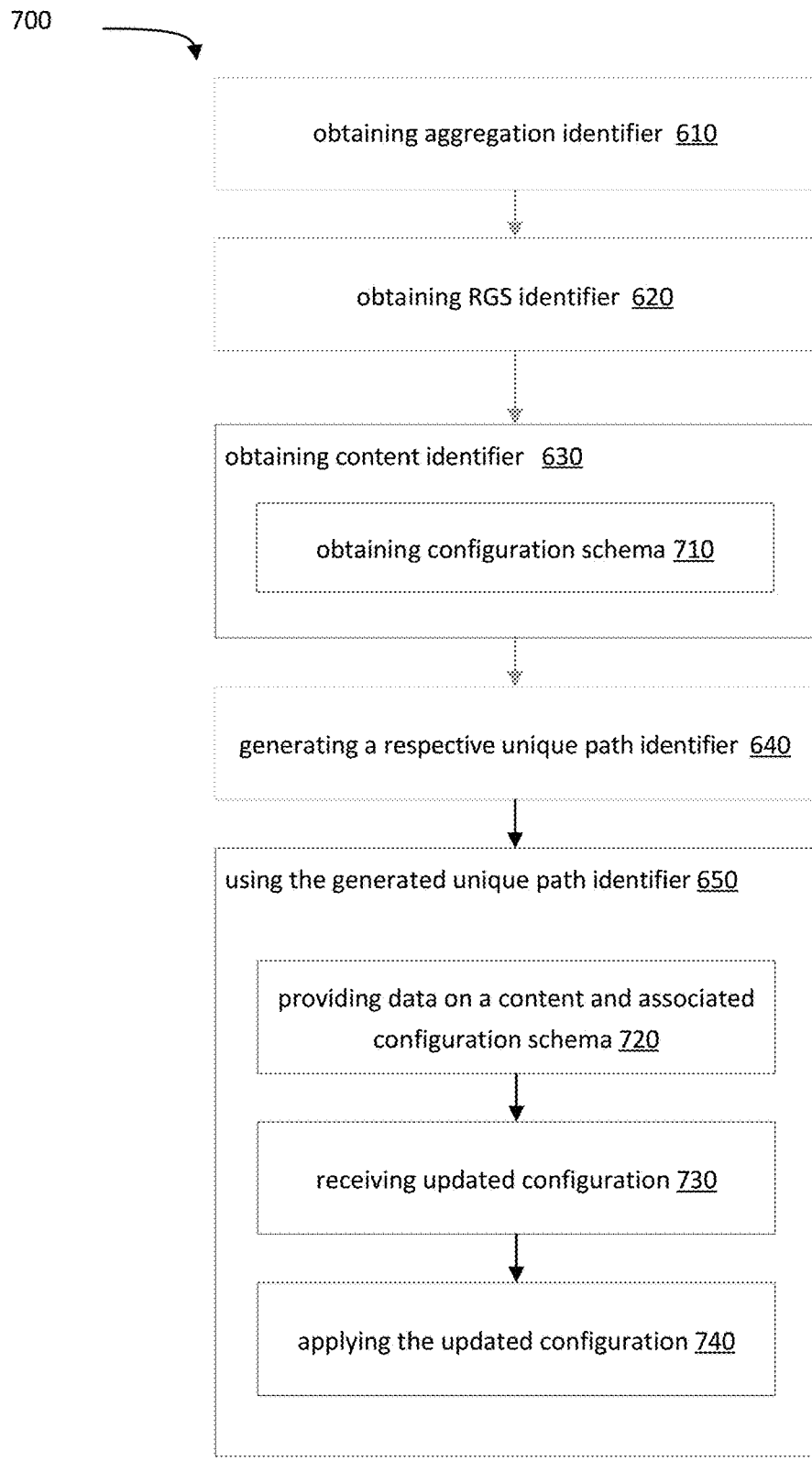
FIG. 7 illustrates a process of configuring configuration schema.

Bearing this in mind, reference is made to FIG. 7 illustrating the process of configuring configuration schema. Some stages of FIG. 7 refer to stages illustrated in relation to FIG. 6. As such, in blocks 610 and 620, AAP 301 obtaining an aggregation identifier from platform 102 and an RGS identifier from RGS 103 through aggregation platform 102 are illustrated. Each RGS 103 is configured to provide a list of pieces of content 104 stored within the RGS 103, and hence, during the discovery process, AAP 301 is configured to obtain at least one content identifier, wherein each content identifier is indicative of characteristics of the content (block 630). In some examples, where a configuration schema was generated e.g. by the content 104 itself and was stored and associated with the content 104, e.g. by the RGS 103, then AAP 301 is configured to obtain also configuration schema associated with the content 104 (block 710). For example, RGS 103 can send the configuration schema associated with a content 104 to AAP 301 through the platform 102. In some examples, AAP 301 obtains the configuration schema during the discovery process. Alternatively or additionally, AAP 301 obtains the configuration schema associated with the particular content 104, based on the respective content identifier, upon request. For example, AAP 301 can send a specific request to a particular RGS 103 storing a particular content 104 with an associated content identifier, to obtain the configuration schema associated with that particular content 104.

AAP 301 can generate a respective unique path identifier (block 640). AAP 301 then uses the generated unique path identifier (block 650), for example, AAP 301 provides data on a stored content 104 and associated configuration schema (block 720). In some examples, AAP 301 displays a list of one or more games and their associated configuration schema to operators, e.g. operators 107 illustrated in relation to FIGS. 1 and 2. The operators 107 can then insert or update data relating to the configuration, based on the configuration schema, and send such data to AAP 301. For example, update to the configuration, based on the configuration schema, includes revising/editing/adding/disabling/removing and updating values of any configuration parameters and/or requirements. AAP 301 obtains the updated configuration (block 730), e.g. by receiving it from operators 107, AAP 103 can then apply the updated configuration (block 740). For example, AAP 301 sends the updated configuration to the RGS 103 storing the particular piece of content 104 associated with the configuration schema, by sending the updated configuration to the aggregation platform 102, which in turn, sends the updated configuration to the RGS 103 storing the particular piece of content 104. Sending the updated configuration can be done using the unique path identifier associated with the particular piece of content 104.

The process of updating configuration associated with the content 104 can be done when the operator initially selects the content 104 to be added to his portfolio, or upon request, after the content 104 has already been added, and the operator 107 then chooses to update the configuration, based on the configuration schema that was provided by the RGS 103. Using the unique path identifier is advantageously such that it enables the AAP 301 to communicate the updates to the particular RGS 103 storing the particular game 104 in the network.

It is noted that the teachings of the presently disclosed subject matter are not bound by the flow charts illustrated in FIGS. 5, 6, and 7 the illustrated operations can occur out of the illustrated order. For example, operations 610, 620 and 630 shown in succession can be executed substantially concurrently, or in the reverse order. It is also noted that whilst the flow chart is described with reference to elements of system 400, this is by no means binding, and the operations can be performed by elements other than those described herein.

It is to be understood that the invention is not limited in its application to the details set forth in the description contained herein or illustrated in the drawings. The invention is capable of other embodiments and of being practised and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer-based content aggregation system, comprising:
   an aggregator aggregation platform (AAP);
   one or more aggregation platforms operatively communicating with the AAP, wherein each of the one or more aggregation platforms is associated with an aggregation identifier indicative of at least a geographic location of the associated aggregation platform;
   at least one remote game server (RGS) configured for storing at least one piece of content and operatively communicating with a designated aggregation platform of the one or more aggregation platforms, wherein each of the one or more RGS is associated with an RGS identifier indicative of at least a geographic location of the associated RGS,
   wherein each of the at least one RGS is configured to:
   associate a content identifier for each of the stored at least one piece of content indicative of characteristics of the content; and communicate the at least one associated content identifier and the RGS identifier to the designated aggregation platform;
wherein each of the at least one aggregation platform is configured to:
communicate to the AAP both the at least one content identifier and the RGS identifier received from each of the at least one RGS, and the aggregation identifier;
wherein the AAP is configured to generate for each of the stored at least one piece of content, a respective unique path identifier, based on the associated content identifier, the RGS identifier and the aggregation identifier, for identifying a logical geographic location of each of the stored at least one piece of content, and
wherein usage of a generated unique path identifier, by the AAP, facilitates communicating data, that pertains to the piece of content identified by the generated unique path identifier.

2. The computer-based content aggregation system of claim 1 wherein the AAP is further configured to:
operatively communicate with at least one external system; and
communicate data that pertains to a specific piece of content stored on a particular RGS, from/to the at least one external system, based on the unique path identifier associated with the specific piece of content.

3. The computer-based content aggregation system of claim 1 wherein the AAP is further configured to send/receive data that pertains to a specific piece of content stored on a particular RGS to/from the AAP and the particular RGS, using the unique path identifier.

4. The computer-based content aggregation system of claim 1 wherein the piece of content is a game, and wherein the characteristics of the content include at least one selected from: operational parameters of the game, configuration characteristics of the game, configuration schema and configuration characteristics of the game based on a configuration schema.

5. The computer-based content aggregation system of claim 4 wherein the at least one RGS is further configured to the receive updated configuration characteristics, based on the configuration schema, and to configure the schema, based on the updated configuration characteristics.

6. The computer-based content aggregation system of claim 4, wherein the RGS identifier includes the RGS type and/or the RGS instance, and the AAP is further configured to communicate updated configuration characteristics, based on the RGS type and/or the RGS instance.

7. A computerized method for identifying a location of piece of content, comprising:
providing an aggregator aggregation platform (AAP), one or more aggregation platforms operatively communicating with the AAP, wherein each of the one or more aggregation platforms is associated with an aggregation identifier indicative of at least a geographic location of the associated aggregation platform and at least one remote game server (RGS) configured for storing at least one piece of content and operatively communicating with a designated aggregation platform of the one or more aggregation platforms, wherein each of at least one RGS is associated with an RGS identifier indicative of at least a geographic location of the associated RGS, the method further comprising:
by a processor of each of the at least one RGS:
associating a content identifier for each of the stored at least one piece of content indicative of characteristics of the content; and
communicating the at least one associated content identifier and the RGS identifier to a designated aggregation platform of one or more aggregation platforms;
by a processor of each of the at least one aggregation platform:
communicating to the AAP both the at least one associated content identifier and the RGS identifier received from each of the at least one RGS, and the aggregation identifier;
by a processor of the AAP:
generating a respective unique path identifier for each of the stored at least one piece of content, based on the associated unique content identifier, the unique RGS identifier, and the unique aggregation identifier, for identifying a logical geographic location of each of the stored at least one piece of content, and
using the generated unique path identifier, to facilitate communicating data, that pertains to the piece of content identified by the generated unique path identifier.

8. A computer-based content aggregation system, comprising:
an aggregator aggregation platform (AAP) comprising a processor;
wherein the AAP is configured, by the processor, to:
operatively communicate with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content;
obtain from each of the one or more aggregation platforms:
(i) the associated aggregation identifier;
(ii) the at least one associated RGS identifier of the at least one RGSs operatively communicating with the aggregation platform; and
(iii) the at least one associated content identifier for each of the at least one piece of content stored in each of the at least one RGS that is operatively communicating with the respective aggregation platform;
generate a respective unique path identifier for each of the stored at least one piece of content, based on the obtained associated content identifier, the obtained RGS identifier and the obtained aggregation identifier, for identifying a logical geographic location of each of the stored at least one piece of content; and
use the generated unique path identifier, to facilitate communicating data, that pertains to the piece of content identified by the generated unique path identifier.

9. The computer-based content aggregation system of claim 8, wherein the AAP is further configured to obtain from each of the one or more aggregation platforms:

(iv) a configuration schema associated with the obtained content; and based on the obtained data and the generated unique path identifier, the AAP is further configured to:

(a) provide data on at least one piece of content and its associated configuration schema;

(b) receive updated configuration characteristics, based on the configuration schema; and (c) apply the updated configuration characteristics.

10. A computerized method for identifying a location of piece of content, comprising:

by a processor of an aggregator aggregation platform (AAP) operatively communicating with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content, the method comprising:

obtaining from each of the one or more aggregation platforms the associated aggregation identifier;

obtaining, through each of the at least one aggregation platform, the at least one RGS identifier;

obtaining, through each of the at least one aggregation platform and the at least one RGS, the at least one associated content identifier for each of the at least one piece of content stored in each of the at least one RGS;

generating a respective unique path identifier for each of the stored at least one piece of content, based on the obtained associated content identifier, the obtained RGS identifier and the obtained aggregation identifier for identifying a logical geographic location of each of the stored at least one piece of content; and using the generated unique path identifier, to facilitate communicating data, that pertains to the piece of content identified by the unique path identifier.

11. The computerized method of claim 10, wherein the obtaining the at least one associated content identifier further comprises obtaining a configuration schema associated with the obtained content, the method further comprising:

is providing data on at least one piece of content and its associated configuration schema, based on the obtained data and the generated unique path identifier;

receiving updated configuration, based on the configuration schema; and applying the updated configuration characteristics.

12. A non-transitory computer readable storage medium tangibly embodying a program of instructions that, when executed by a computer, cause the computer to perform a method for identifying a location of a piece of content, comprising:

providing an aggregator aggregation platform (AAP), one or more aggregation platforms operatively communicating with the AAP, wherein each of the one or more aggregation platforms is associated with an aggregation identifier indicative of at least a geographic location of the associated aggregation platform and at least one remote game server (RGS) configured for storing at least one piece of content and operatively communicating with a designated aggregation platform of the one or more aggregation platforms, wherein each of at least one RGS is associated with an RGS identifier indicative of at least a geographic location of the associated RGS, the method further comprising:

by a processor of each of the at least one RGS:

associating a content identifier for each of the stored at least one piece of content indicative of characteristics of the content; and communicating the at least one associated content identifier and the RGS identifier to a designated aggregation platform of one or more aggregation platforms;

by a processor of each of the at least one aggregation platform:

communicating to the AAP both the at least one associated content identifier and the RGS identifier received from each of the at least one RGS, and the aggregation identifier;

by a processor of the AAP:

generating a respective unique path identifier for each of the stored at least one piece of content, based on the associated unique content identifier, the unique RGS identifier, and the unique aggregation identifier, for identifying a logical geographic location of each of the stored at least one piece of content, and using the generated unique path identifier, to facilitate communicating data, that pertains to the piece of content identified by the generated unique path identifier.

13. A non-transitory computer readable storage medium tangibly embodying a program of instructions that, when executed by a computer, cause the computer to perform a method for identifying a location of piece of content, comprising:

by a processor of an aggregator aggregation platform (AAP) operatively communicating with one or more aggregation platforms, wherein each of the one or more aggregation platforms is associated with an aggregation identifier indicative of at least a geographic location of the associated aggregation platform, and wherein each of the one or more aggregation platforms is configured to operatively communicate with at least one remote game server (RGS), wherein each of the one or more RGS is associated with an RGS identifier indicative of at least a geographic location of the associated RGS, and is configured for storing at least one piece of content, and to associate a content identifier for each of the stored at least one piece of content indicative of characteristics of the content, the method comprising:

obtaining from each of the one or more aggregation platforms the associated aggregation identifier;

obtaining, through each of the at least one aggregation platform, the at least one RGS identifier;

obtaining, through each of the at least one aggregation platform and the at least one RGS, the at least one associated content identifier for each of the at least one piece of content stored in each of the at least one RGS;

generating a respective unique path identifier for each of the stored at least one piece of content, based on the obtained associated content identifier, the obtained RGS identifier and the obtained aggregation identifier for identifying a logical geographic location of each of the stored at least one piece of content; and using the generated unique path identifier, to facilitate communicating data, that pertains to the piece of content identified by the unique path identifier.

* * * * *